United States Patent [19]

Kurihara et al.

[11] Patent Number: 4,636,374

[45] Date of Patent: Jan. 13, 1987

[54] METHOD FOR MANUFACTURING ALUMINUM OXYNITRIDE REFRACTORY

[75] Inventors: Susumu Kurihara, Shimizu; Tadashi Seki, Tokyo; Hiroshi Awata; Hitoshi Kadowaki, both of Shimizu, all of Japan

[73] Assignee: Nikkei Kako Kabushiki Kaisha, Tokyo, Japan

[21] Appl. No.: 791,355

[22] Filed: Oct. 25, 1985

[30] Foreign Application Priority Data

Oct. 26, 1984 [JP] Japan .................................. 59-224046

[51] Int. Cl.$^4$ ........................ C01B 21/20; C04B 35/58
[52] U.S. Cl. ..................................... 423/385; 501/96; 501/98; 501/153; 501/155
[58] Field of Search ................... 501/96, 153, 98, 155; 423/385

[56] References Cited

U.S. PATENT DOCUMENTS

| 2,480,475 | 3/1946 | Johnson | 501/96 |
| 2,480,901 | 7/1946 | Bowden et al. | 501/153 |

FOREIGN PATENT DOCUMENTS

| 52-50040 | 4/1977 | Japan . | |
| 285575 | 1/1971 | U.S.S.R. | 501/98 |

*Primary Examiner*—Mark L. Bell
*Attorney, Agent, or Firm*—William J. Daniel

[57] ABSTRACT

An aluminum oxynitride refractory of a sufficiently high nitrogen content is produced efficiently and inexpensively by a method which comprises mixing alumina of Bayer Process with aluminum dross and electrically fusing the resultant mixture in an electric furnace.

3 Claims, No Drawings

METHOD FOR MANUFACTURING ALUMINUM OXYNITRIDE REFRACTORY

BACKGROUND OF THE INVENTION

1. Field of the Invention

This invention relates to a method for the manufacture of aluminum oxynitride, and more particularly to a method for the manufacture of aluminum oxynitride refractory using aluminum dross as starting material for yielding the desired nitride.

2. Description of the Prior Art

It has been known heretofore to obtain aluminum oxynitride represented by the chemical formula, $mAl_2O_3 \cdot nAlN$ by heating to sinter a mixture of micronized alumina with powdered aluminum nitride. The aluminum oxynitride so produced exhibits satisfactory resistance to fire and heat and possesses outstanding corrosion resistance in molten metal and, therefore, is expected to find extensive utility as a refractory material particularly for use in a reducing atmosphere.

Aluminum oxynitride can be obtained, as described above, by heating under sintering conditions a mixture of alumina powder and aluminum nitride powder. When this method is used, the resultant refractory is inevitably expensive. This is because this specific sintering method makes it necessary to use, as raw material, an alumina which has been adjusted extremely finely to a particle diameter of the order of not more than several microns and, consequently, is relatively expensive when used as a starting material for aluminum nitride powder.

Therefore, other methods have been proposed which use, as a starting material for production of aluminum oxynitride refractory, alumina obtained by Bayer Process which is mass produced commercially and is available at a low price. In the specification of Japanese Patent Publication No. SHO 53(1978)-14,247, for example, a method is disclosed which effects incorporation of nitrogen in electrically fused alumina by taking alumina of Bayer Process and electrically fusing this alumina in an atmosphere of nitrogen gas. By this method, however, a refractory having a high nitrogen content cannot be obtained because incorporation of an adequate amount of nitrogen in the alumina is difficult to attain.

In the specification of Japanese Patent Publication No. SHO 52(1977)-50,040, a method for the manufacture of a nitrogen-containing alumina refractory is disclosed which comprises mixing alumina obtained by the Bayer Process with metallic aluminum powder and electrically fusing the resultant mixture of a nitrogen-containing atmosphere (inclusive of natural atmosphere). The method disclosed in this specification consists in causing the metallic aluminum powder incorporated in advance in the alumina to be converted, during the course of electric fusion of the alumina, by a nitriding reaction into aluminum nitride and effecting incorporation of the aluminum nitride into fused alumina. As compared with the method of the aforementioned specification of Japanese Patent Publication No. SHO 53(1978)-14,247, this method is capable of producing a refractory of a notably high nitrogen content. This method nevertheless has the following disadvantages.

To be more specific, the method disclosed in the specification of Japanese Patent Publication No. SHO 52(1977)-50,040 comprises a linear mixing of alumina from the Bayer Process with metallic aluminum powder and electrically fusing the resultant mixture in a nitrogen-containing atmosphere (inclusive of natural atmosphere) thereby enabling the metallic aluminum powder incorporated in the alumina to be converted into aluminum nitride and effecting incorporation of the aluminum nitride in the fused alumina. When this reaction method is worked by using air as the nitrogen-containing atmosphere, the metallic aluminum powder incorporated in the alumina is nitrided and, at the same time, a considerable portion of the metallic aluminum powder is oxidized with the oxygen in the air. This method, therefore, has the disadvantage that the metallic aluminum powder used therein is not wholly utilized effectively and, as the result, the nitrogen content of the product cannot be easily standardized between different lots of production. For the purpose of eliminating the disadvantage described above and ensuring effective utilization of the metallic aluminum powder used in the production, therefore, it becomes necessary to keep the electric furnace containing the alumina wholly in a tightly closed state and carry out the work of electric fusion with the interior of the furnace filled completely with an atmosphere solely of nitrogen gas. As the result, the operation becomes complicated and the cost of equipment becomes high.

SUMMARY OF THE INVENTION

In view of the actual status of affairs described above, the inventors continued a variety of studies directed to materializing inexpensive mass-production of an aluminum oxynitride refractory more efficiently than the conventional method by using alumina from the Bayer Process as raw material. They eventually came to take notice of the fact that the so-called aluminum dross which occurs as residue at an aluminum refining plant or melting plant consists preponderantly of fine $Al_2O_3$ particles produced by the spontaneous oxidation of fused aluminum and additionally contains a nitrogen component in the form of AlN intimately mixed with the fine $Al_2O_3$ particles. They have consequently found that when the alumina from the Bayer Process is mixed with this aluminum dross and the resultant mixture is electrically fused in an electric furnace in the same manner as in the conventional production of fused alumina, the AlN component present in the dross and the fine $Al_2O_3$ particles constituting the main component of the dross are mutually bound by the applied heat and the resultant bound composite is readily incorporated in the fused mass of the alumina from the Bayer Process to give rise to a nitrogen-containing fused alumina. The present invention has been produced based on the knowledge described above.

DETAILED DESCRIPTION OF THE INVENTION

To be specific, this invention is directed to a method for the manufacture of an aluminum oxynitride refractory, characterized by mixing alumina obtained from the Bayer Process with aluminum dross and electrically fusing the resultant mixture in an electric furnace.

As described above, this invention resides in a method for the manufacture of an aluminum oxynitride refractory by using Bayer Process alumina as raw material, mixing this alumina with aluminum dross, and electrically fusing the resultant mixture thereby effecting incorporation of nitrogen in the fused alumina.

As the source for alumina to be used in the method of this invention, commercially available alumina obtained by the Bayer Process can be adopted in its unmodified form.

The aluminum dross to be used as the source for nitrogen is the residue which remains after recovering metallic aluminum component to the fullest possible extent from the dross occurring at an aluminum refining plant or melting plant. It consists preponderantly of fine $Al_2O_3$ particles produced by spontaneous oxidation of fused aluminum and additionally contains a nitrogen component in the form of AlN intimately mixed with the aforementioned fine $Al_2O_3$ particles. It has a small amount of metallic aluminum component adhering thereto as a residue. A typical composition of the aluminum dross is shown in Table 1 below.

TABLE 1

| Typical Composition of Aluminum Dross | | | |
|---|---|---|---|
| $Al_2O_3$ | AlN | Metallic Al | Others |
| 60 to 80% | 5 to 15% | 5 to 15% | Balance |

In the method of the present invention, the aluminum dross and the alumina of Bayer Process are mixed and, then the mixture is electrically fused. In this case, the mixing ratio of the dross and the alumina may be suitably fixed by taking into consideration the nitrogen content of the dross and the ultimate nitrogen content of the fused refractory. Since the aluminum dross is one form of waste produced in the fusion of aluminum as described above, however, it has no fixed composition. Thus, the nitrogen content of the dross may vary roughly in the range of 5 to 15% as AlN, from one lot to another.

In the method of this invention, when the aluminum dross selected as a nitrogen-containing raw material has a relatively low nitrogen content and the refractory to be obtained is desired to have a large nitrogen content, the amount of the dross to be mixed with the Bayer Process aluminum must be sufficiently large. When the aluminum dross is used in such a large amount as described above, there ensues the possibility that the dross which is in the form of fine particles will be widely scattered and loss during the electric fusion of the mixture and the impurities entrained by the dross will find their way into the eventual refractory and impair the purity thereof.

When the selected dross happens to have a low nitrogen content and the produced alumina is expected to have a relatively high nitrogen content, therefore, it is desirable that the aluminum dross to be used should be subjected in advance to a nitriding treatment to have its nitrogen content sufficiently heightened in advance. The nitriding of the dross can be effected, for example, by placing the dross in an alumina refractory container and heating it therein in an atmosphere of nitrogen gas at a temperature of about 600° to 700° C. By the applied heat, the metallic aluminum remaining in the dross begins to undergo a nitriding reacting and the heat of this reaction further elevates the temperature of the reaction system and, consequently, the metallic aluminum contained in the dross is substantially completely converted into AlN, with the result that the nitrogen content of the dross is increased.

When the dross to be used has a low metallic aluminum content or when the aluminum oxynitride refractory to be produced is expected to have a particularly high nitrogen content, the desired increase of the nitrogen content of the produced refractory is attained by adding a suitable amount of metallic aluminum to the dross before the dross undergoes the nitriding treatment. In this case, the ease with which the nitriding reaction of the dross proceeds increases in proportion as the grain size of the metallic aluminum added to the dross decreases. Notwithstanding this conclusion, the metallic aluminum so added is not always required to be finely divided. It can be added in the form of fine granules, fine foil strips, or fine chips. If the amount of the metallic aluminum added to the dross is too large, since the applied heat fuses and agglomerates the added metallic aluminum, there ensues the possibility that the nitriding reaction will be obstructed and the metallic aluminum will remain in an unaltered form in the residue of the nitriding reaction. It is, therefore, desirable that the amount of the metallic aluminum added to the dross should avoid exceeding about 50% by weight.

Then, the mixture of the Bayer Process alumina with aluminum dross in its unmodified form or the aluminum dross after being perliminarily subjected to the aforementioned nitriding treatment is electrically fused. This electric fusion can be carried out in the atmosphere in an AC arc furnace using a carbon electrode, for example, in much the same manner as in the conventional production of fused alumina. Owing to this electric fusion, the AlN component in the dross and the fine $Al_2O_3$ particles constituting the main component of the dross are mutually bound and the resultant bound composite is incorporated into the fused mass of Bayer Process alumina to give rise to a nitrogen-containing fused alumina.

The fused mass consequently obtained may be directly cast in a molding die to produce a cast refractory. Otherwise, the fused mass may be solidified and then comminuted in a suitable grain size and used as aggregate component for sintered refractories and castable refractories.

As described above, the present invention consists in a method for the manufacture of an aluminum oxynitride refractory by the use of Bayer Process alumina available inexpensively in large amounts and the dross formed in the fusion of aluminum at an aluminum refining plant or melting plant. Thus, the raw materials are cheap. Fusion of the mixture of the alumina with the dross is not required to be carried out in a tightly sealed electric furnace in an atmosphere of nitrogen gas as disclosed in the specification of Japanese Patent Publication No. SHO 52(1977)-50,040. Instead, it can be carried out effectively in the atmosphere similar to that in conventional production of fused alumina. This invention enjoys the advantage that the cost of equipment is low and the operation is easy to perform and fused refractories of high nitrogen content can be mass-produced.

Now, the present invention will be described more specifically below with reference to working examples.

EXAMPLE 1

A mixture consisting of 100 parts by weight of aluminum dross (analyses: 75% of $Al_2O_3$, 13.5% of AlN, and 6% of metallic aluminum) and 50 parts by weight of Bayer Process alumina was prepared. In an AC three-phase arc furnace rated at 30 kVA, about 20 Kg of the mixture was fused at 75 V and 200 A for two hours. Consequently, there was obtained an aluminum oxynitride ingot about 19 kg in weight.

When this ingot was crushed and analyzed, it was found to have an average nitrogen content of about 3.1%.

EXAMPLE 2

A mixture consisting of 100 parts by weight of the same aluminum dross as used in Example 1 and 100 parts by weight of alumina of Bayer Process was prepared. In the same arc furnace as used in Example 1, about 20 kg of the resultant mixture was fused for about two hours. Consequently, there was obtained an aluminum oxynitride ingot about 19 kg in weight.

This ingot, on analysis, was found to have an average nitrogen content of about 2.4%.

EXAMPLE 3

An aluminum dross (analyses: 70% of $Al_2O_3$, 6% of AlN, and 11% of metallic aluminum) was placed in a high-alumina content alumina refractory container, and the interior gas of the container was displaced with $N_2$ gas introduced downwardly through the top. In the resultant atmosphere of nitrogen, the alumina dross was heated with a burner for about 20 minutes to effect a nitriding treatment. The analyses of the resultant nitrided dross are shown in Table 2.

TABLE 2

| $Al_2O_3$ | AlN | Metallic aluminum |
| --- | --- | --- |
| 68% | 21% | — |

A mixture consisting of 100 parts by weight of Bayer Process alumina and 80 parts by weight of the aforementioned nitrided dross was prepared. In an AC three-phase arc furnace rated at 30 kVA, 20 kg of the aforementioned mixture was fused at 75 V and 200 A for about two hours. Consequently, there was obtained an aluminum oxynitride ingot about 19 kg in weight.

When this ingot was crushed and analyzed, it was found to have an average nitrogen content of about 3.2%.

EXAMPLE 4

One hundred (100) parts by weight of the same aluminum dross as used in Example 3 and 20 parts by weight of metallic aluminum ribbons (square of about 4 mm) were thoroughly mixed. The resultant mixture was subjected to the same nitriding treatment in an atmosphere of nitrogen as in Example 3.

The analyses of the nitrided dross are shown in Table 3.

TABLE 3

| $Al_2O_3$ | AlN | Metallic aluminum |
| --- | --- | --- |
| 54% | 37% | — |

A mixture consisting of 100 parts by weight of alumina of Bayer Process and 40 parts by weight of the aforementioned nitrided dross was prepared. By following the procedure of Example 3, 20 kg of the resultant mixture was fused in an arc furnace for about two hours. Consequently, there was obtained an aluminum oxynitride ingot about 19 kg in weight.

This ingot, on analysis, was found to have an average nitrogen content of about 3.9%.

What is claimed is:

1. A method for the manufacture of an aluminum oxynitride refractory, characterized by mixing alumina with aluminum dross and electrically fusing the resultant mixture in an electric furnace.

2. The method of claim 1 wherein said dross contains metallic aluminum and said dross is heated in a nitrogen atmosphere before being mixed with said alumina in order to convert at least some of said aluminum metal to aluminum nitride.

3. The method of claim 2 wherein additional metallic aluminum is incorporated into said dross before the latter is heated in said nitrogen atmosphere to increase the amount of aluminum nitride in said dross before mixture of the same with said alumina.

* * * * *